(12) United States Patent
Li et al.

(10) Patent No.: US 7,755,293 B2
(45) Date of Patent: Jul. 13, 2010

(54) METHOD FOR PROTECTING A LAMP CIRCUIT AND RELATED WIRING

(75) Inventors: Kang Li, Windsor (CA); Daniel Moore, Canton, MI (US)

(73) Assignee: Yazaki North America, Inc., Canton, MI (US)

( * ) Notice: Subject to any disclaimer, the term of this patent is extended or adjusted under 35 U.S.C. 154(b) by 280 days.

(21) Appl. No.: 12/141,970

(22) Filed: Jun. 19, 2008

(65) Prior Publication Data

US 2009/0315465 A1 Dec. 24, 2009

(51) Int. Cl.
*B60Q 1/14* (2006.01)
(52) U.S. Cl. .......................... 315/77; 315/82; 315/291; 315/307
(58) Field of Classification Search .................... 315/77, 315/82, 224, 291, 294, 299, 307, 308, 312, 315/320, 324; 307/10.1, 10.8; 324/500, 324/504
See application file for complete search history.

(56) References Cited

U.S. PATENT DOCUMENTS

| | | | |
|---|---|---|---|
| 6,998,807 B2 | 2/2006 | Phillips et al. | |
| 7,126,290 B2 | 10/2006 | Elliott | |
| 7,154,276 B2 | 12/2006 | Bertness | |
| 7,274,150 B2* | 9/2007 | Takeda et al. | 315/77 |
| 7,327,051 B2 | 2/2008 | Ito et al. | |
| 2004/0178737 A1* | 9/2004 | Takeda et al. | 315/77 |
| 2005/0179393 A1* | 8/2005 | Murakami et al. | 315/77 |

* cited by examiner

*Primary Examiner*—Douglas W Owens
*Assistant Examiner*—Tung X Le
(74) *Attorney, Agent, or Firm*—Harness, Dickey & Pierce, P.L.C.

(57) ABSTRACT

A method for controlling a lamp circuit that includes: setting a first voltage threshold and a first time window within a control circuit corresponding to a characteristic of a first lamp type; providing a first signal through the lamp circuit to start a first time interval and create a first test voltage; comparing the first test voltage to the first voltage threshold; and operating a switch to couple an output of the lamp circuit to a source of electrical power if the first test voltage is greater than or equal to the first voltage threshold before the first time interval exceeds the first time window.

22 Claims, 7 Drawing Sheets

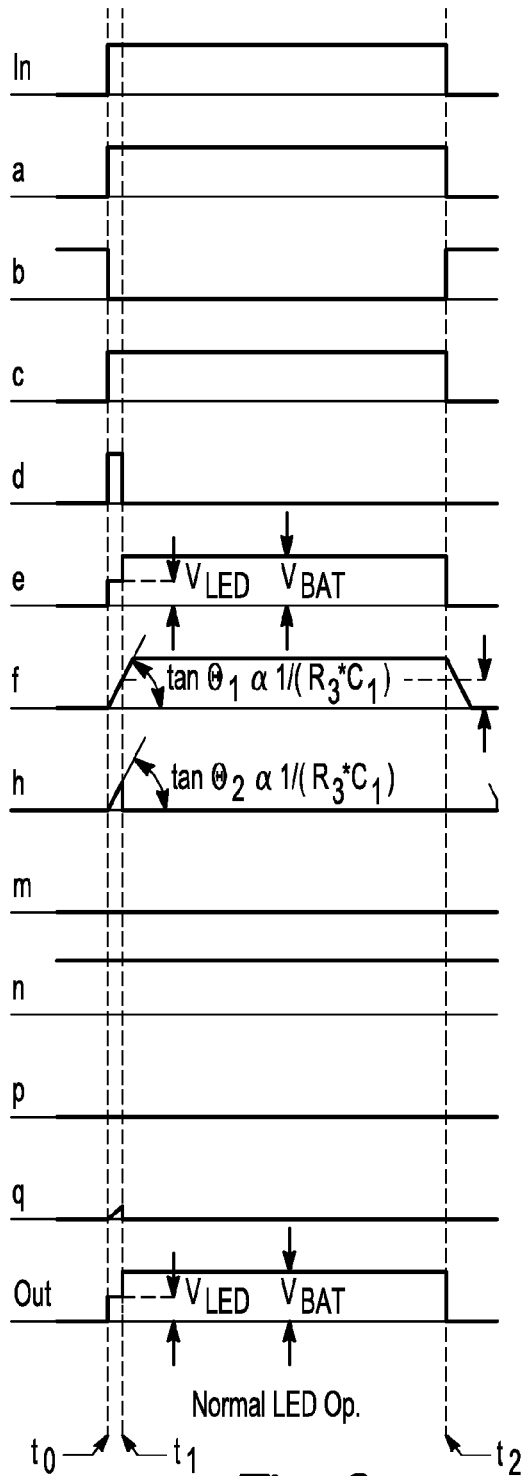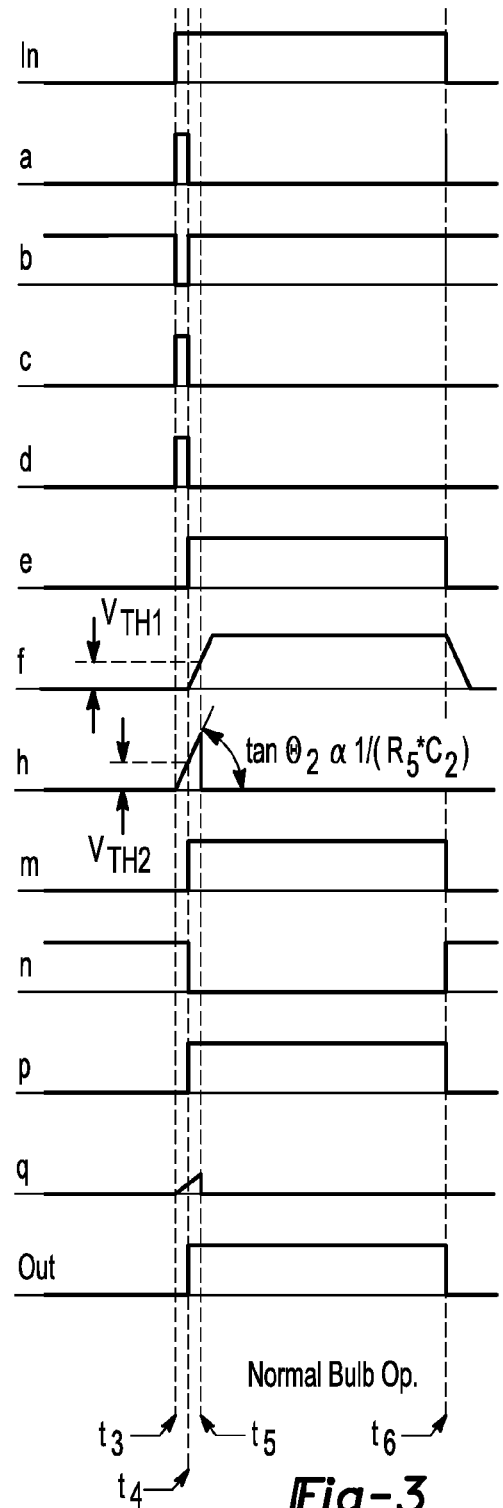

METHOD FOR PROTECTING A LAMP CIRCUIT AND RELATED WIRING

INTRODUCTION

The present invention generally relates to lamp circuits and related wiring. More particularly, the present invention relates to a control circuit for protecting a lamp circuit and related wiring and a related method.

Light emitting diodes (LEDs) are employed ever more frequently in automotive electric systems as they tend to be more efficient than incandescent lights having the same output. Due to the reduced level of current required for operation of the LED lights, an automotive electric system can be formed with relatively lighter gauge wire to thereby reduce the cost of the automotive electric system.

In situations where it is possible to connect the output of a lamp circuit to LEDs and to incandescent lamps (e.g., an automotive vehicle that can be selectively coupled to a first trailer having LED lights, and a second trailer having incandescent lights), it may be desirable to protect the relatively lighter gauge wire that can be used to transmit electric power to the LEDs from exposure to too much current while providing sufficient electric current for operating the incandescent lights.

Conventional control circuits for protecting the lamp circuit of an automotive electric system typically rely on current sensing mechanism to collect information relating to the operation of a lamp circuit. Such control circuits can employ direct measurement of the electric current flowing through the lamp circuit or indirect measurement of the electric current, as by sampling a voltage drop caused by the electric current or a rise in the temperature of a device (e.g., a bi-metal switch or fuse) through which the current flows. Such control circuits, however, tend to be expensive, complicated in design and/or do not provide desired intermittent short-circuit protection or reliability.

SUMMARY

In one form, the present teachings provide a method for controlling a lamp circuit. The method includes: setting a first voltage threshold and a first time window within a control circuit corresponding to a characteristic of a first lamp type; providing a first signal through the lamp circuit to start a first time interval and create a first test voltage; comparing the first test voltage to the first voltage threshold; and operating a switch to couple an output of the lamp circuit to a source of electrical power if the first test voltage is greater than or equal to the first voltage threshold before the first time interval exceeds the first time window.

In another form, the present teachings provide a method for controlling a lamp circuit that includes: setting a first voltage threshold within a control circuit corresponding to a characteristic of a first lamp type; providing a first signal to a lamp; comparing a measured voltage drop across the lamp to the first voltage threshold to determine whether the lamp is the first lamp type; and activating a first circuit portion of the control circuit to couple a power source to the output of the lamp circuit if the lamp is the first type of lamp.

Further areas of applicability will become apparent from the description provided herein. It should be understood that the description and specific examples are intended for purposes of illustration only and are not intended to limit the scope of the present disclosure, its application and/or uses in any way.

BRIEF DESCRIPTION OF THE DRAWINGS

The drawings described herein are for illustration purposes only and are not intended to limit the scope of the present disclosure in any way. Similar or identical elements are given consistent identifying numerals throughout the various figures.

FIG. 2 is a schematic illustration of the voltage at various points of the automotive electric system of FIG. 1 when a set of lamps that is comprised of light emitting diodes is coupled to the output of the automotive electric system;

FIG. 3 is a schematic illustration of the voltage at various points of the automotive electric system of FIG. 1 when a set of lamps that is comprised of incandescent lights is coupled to the output of the automotive electric system;

DETAILED DESCRIPTION OF THE VARIOUS EMBODIMENTS

Figure 1:
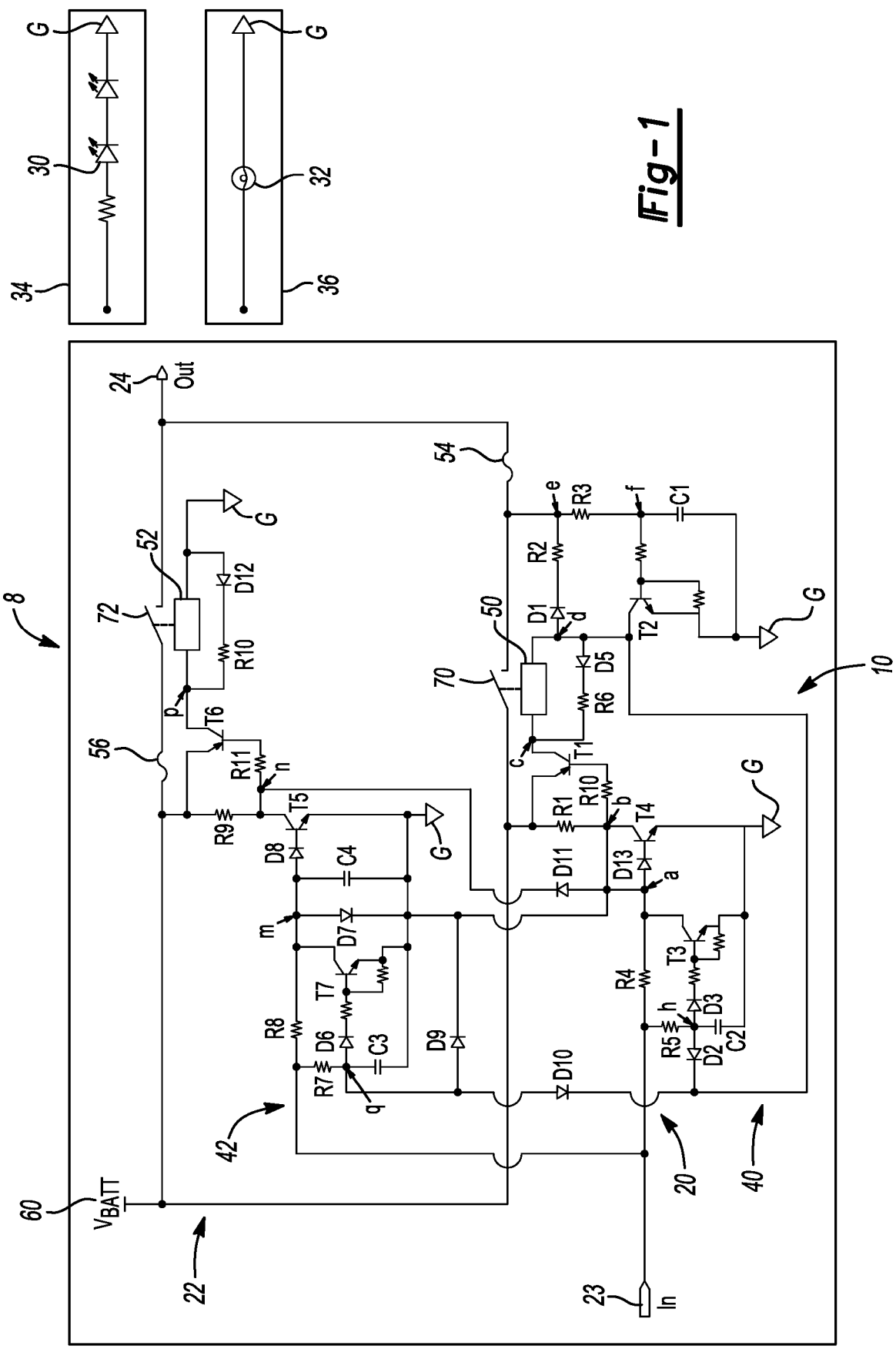
FIG. 1 is a schematic illustration of a vehicle having an automotive electric system constructed in accordance with the teachings of the present disclosure, the vehicle shown in association with a pair of trailers.

With reference to FIG. 1 of the drawings, a vehicle 8 having an automotive electric system 10 constructed in accordance with the teachings of the present invention is shown. The automotive electric system 10 can include a control circuit 20 and a lamp circuit 22 having an output terminal 24 that can be selectively coupled to a set of lamps. The set of lamps can comprise one or more light emitting diodes 30 or, in the alternative, could comprise one or more incandescent lights 32. In the example provided, a first trailer lamp circuit 34 includes a set of lamps that consist of light emitting diodes 30, a second trailer lamp circuit 36 includes a set of lamps that consist of incandescent lamps 32 and the first and second trailer lamp circuits 34 and 36 may be selectively coupled to the vehicle 8 such that the output terminal 24 of the lamp circuit 22 can be coupled to either the light emitting diodes 30 or the incandescent lamps 32.

The control circuit 20 can include a first circuit portion 40 and a second circuit portion 42. The first circuit portion 40 can be employed to identify whether the set of lamps is comprised of a first type of light, such as light emitting diodes, and to control the lamp circuit 22 responsively, while the second circuit portion 42 can be employed to identify whether the set of lamps is comprised of a second type of light, such as incandescent lights, and to control the lamp circuit 22 responsively.

The lamp circuit 22 can include the output terminal 24, a first switching device 50, a second switching device 52, a first circuit protection device 54 and a second circuit protection device 56. The first and second switching devices 50 and 52 can selectively couple to the output terminal 24 to an appropriate power source 60, such a battery. In the particular example provided, the first and second switching devices 50 and 52 are normally open relays, but it will be appreciated that other types of switching devices, such as field effect transistors (FETs), could be employed. The first circuit protection device 54 can be disposed between the first switching device 50 and the output terminal 24, while the second circuit protection device 56 can be disposed between the power source 60 and the second switching device 52. In the particular example provided, the first and second circuit protection devices 54 and 56 are fuses, but those of skill in the art will appreciate that they can be any type of device for limiting the current passing there through, such as a circuit breaker.

A low current test signal can be selectively applied to the output terminal 24 from the control circuit 20. When the set of lamps is comprised of one or more light emitting diodes 30 (i.e., when the trailer lamp circuit 34 is coupled to the vehicle 8 in the example provided), the application of the low current test signal to the output terminal 24 creates a voltage drop or test voltage between the output terminal 24 of the lamp circuit 22 and an electrical ground G. The voltage drop can be employed to identify whether the set of lamps corresponds to a first lamp type.

With additional reference to FIG. 2, an activated input signal from the vehicle 8 at the input terminal 23 can be employed at time to in the example provided to turn a fourth transistor T4 on so that a node b is coupled to the electrical ground G, which in turn causes a first transistor T1 to turn on to conduct electrical energy through the first switching device 50, a first diode D1, a second resistor R2, the first circuit protection device 54 and to the output terminal 24 of the lamp circuit 22. Note that the resistance of the second resistor R2 is large enough so that the current that flows through the first switching device 50 does not cause a switch element 70 associated with the first switching device 50 to close (and thereby couple the output terminal 24 to the power source 60). Current applied to the output terminal 24 passes through the set of lamps (i.e., LED's in this example) to create a test voltage. The test voltage is employed to charge a first capacitor C1 to create a first test voltage. A fourth capacitor C4 can be employed to ensure that a fifth transistor T5 does not turn on prior to the fourth transistor T4. When turned on, the fourth transistor T4 can pull node m low via a seventh diode D7, so that a fifth transistor T5 and a sixth transistor T6 are maintained in an off condition and the second switching device 52 is maintained in an open condition. The activated input signal can also be employed to charge a second capacitor C2 and a third capacitor C3 to create a second test voltage and a third test voltage, respectively. The control circuit 20 can be configured such that a second transistor T2 turns on before a third transistor T3 and a seventh transistor T7 through selection of three associated time windows (i.e., a first time window, a second time window and a third time window) by paring of the capacitance of the capacitors, the resistance of associated resistors and three threshold voltages.

From time $t_0$ to $t_1$, the test voltage continues to charge the first capacitor C1 until the voltage across the first capacitor C1 reaches a first predetermined threshold voltage $V_{TH1}$ at time $t_1$. At this time, a second transistor T2 will turn on and couple the first switching device 50 to an electrical ground G so that the switch element 70 associated with the first switching device 50 will close (to thereby couple the output terminal 24 to the power source 60). When the second transistor T2 turns on, node h and node q are pulled low through a second diode D2 and a tenth diode D10, respectively, to thereby maintain the third transistor T3 and the seventh transistor T7 in an off condition. Voltage at node f will eventually rise to the voltage $V_{BATT}$ of the power source 60, but voltage that exceeds VTH1 will not affect the control circuit 20.

At time $t_2$, the input signal at the input terminal 23 is deactivated, which turns the fourth transistor T4 off, causing the first transistor T1 to turn off and the first switching device 50 to de-energize.

With reference to FIGS. 1 and 3, when the set of lamps is comprised of one or more incandescent lights 32 (i.e., when the trailer lamp circuit 36 is coupled to the vehicle 8 in the example provided), the application of the low current test signal to the control circuit 20 produces a second voltage drop or test voltage between the output terminal 24 of the lamp circuit 22 and an electrical ground G that is considerably lower (e.g., negligible).

At time $t_3$, the activated input signal at the input terminal 23 can be employed in the example provided to turn the fourth transistor T4 on so that a node b is coupled to the electrical ground G, which in turn causes the first transistor T1 to turn on to conduct electrical energy through the first switching device 50, the first diode D1, the second resistor R2, the first circuit protection device 54 and to the output terminal 24 of the lamp circuit 22. Note that the resistance of the second resistor R2 is large enough so that the current that flows through the first switching device 50 does not cause the switch element 70 associated with the first switching device 50 to close (and thereby couple the output terminal 24 to the power source 60). Current applied to the output terminal 24 passes through the set of lamps (i.e., incandescent lights in this example) to create the test voltage. As the test voltage is relatively low, the first capacitor C1 is not charged sufficiently to turn the second transistor T2 on. The activated input signal at the input terminal 23 also charges the second capacitor C2 and the third capacitor C3 through the fifth resistor R5 and the seventh resistor R7, respectively. The time constant C2×R5 is smaller than the time constant C3×R7 so that the third transistor T3 turns on before the seventh transistor T7. At time $t_4$, the voltage across the second capacitor C2 reaches a second predetermined threshold $V_{TH2}$, causing the third transistor T3 to turn on, which causes the fourth transistor T4 and the first transistor T1 to turn off. As the fourth transistor T4 no longer holds node m low, a fourth capacitor C4 charges, causing a fifth transistor T5 to turn on, which in turn causes a sixth transistor T6 to turn on and a switch element 72 associated with the second switching device 52 to close. Closing of the switch element 72 couples the output terminal 24 to the power source 60 (to provide power to the incandescent lights 32). Voltage at node e will eventually rise to the voltage $V_{BATT}$ of the power source 60, which charges the first capacitor C1. Turning on the fifth transistor T5 holds node a low through the eleventh diode D11 and prevents the fourth transistor T4 from turning on again.

At time $t_5$, the voltage across the first capacitor C1 reaches the first predetermined threshold $V_{TH1}$, causing the second transistor T2 to turn on. When on, the second transistor T2 pulls node h and node q low through the second diode D2 and the tenth diode D10, respectively, which causes the third transistor T3 to turn off. In this condition, the seventh transistor T7 is maintained in an off condition, while the fifth transistor T5 and the sixth transistor T6 are maintained in an on condition. As the fifth transistor T5 is in the on condition, node A is low, which maintains the fourth transistor T4 and the first transistor T1 in an off condition and the switch element 70 associated with the first switching device 50 in an open condition.

At time $t_6$, the input signal at the input terminal 23 is deactivated, which turns the fifth transistor T5 off, causing the sixth transistor T6 to turn off and the second switching device 52 to de-energize.

Figure 4:
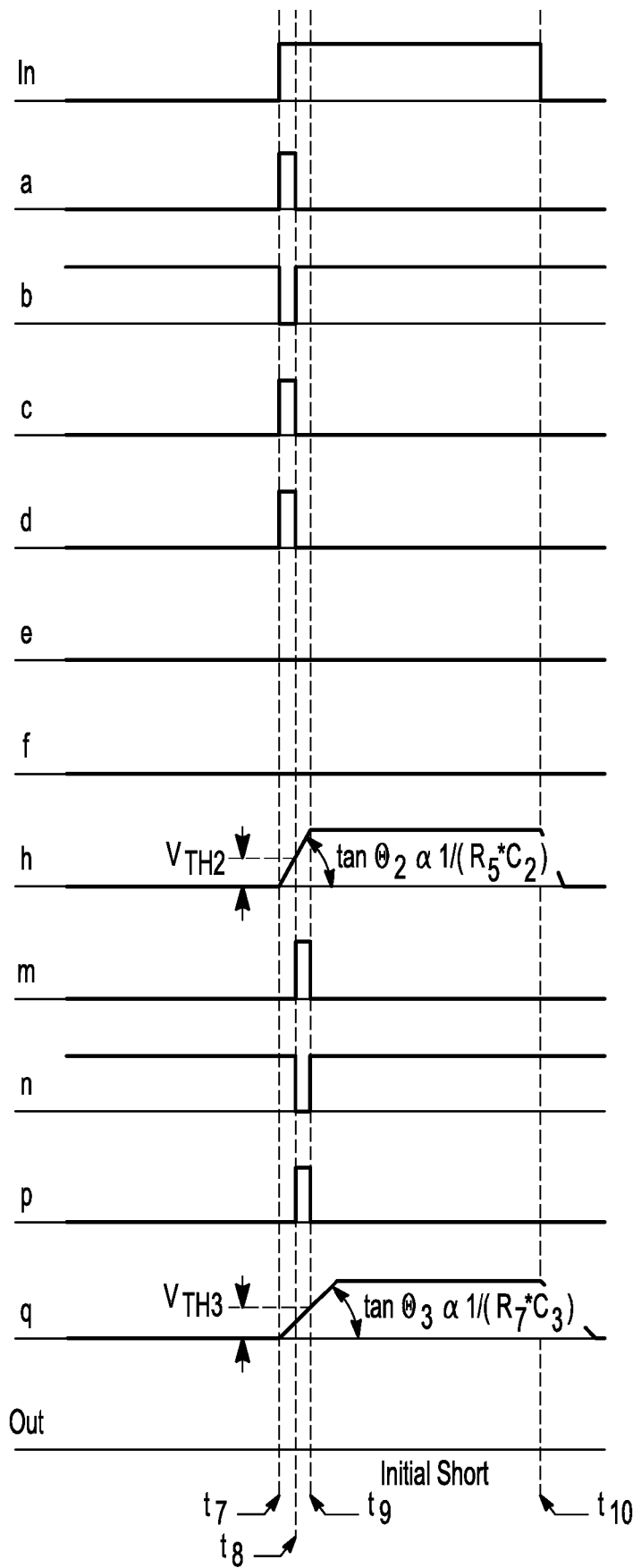
FIG. 4 is a schematic illustration of the voltage at various points of the automotive electric system of FIG. 1 when a short circuit is coupled to the output of the automotive electric system.

If a short circuit occurs between the output terminal 24 and the electrical ground G, the control circuit 20 can open the switch element 72 associated with the second switching device 52 to prevent damage to the lamp circuit 22. With reference to FIGS. 1 and 4, the activated input signal at the input terminal 23 can be employed time $t_7$ to turn the fourth transistor T4 on so that a node b is coupled to the electrical ground G, which in turn causes the first transistor T1 to turn on to conduct electrical energy through the first switching device 50, the first diode D1, the second resistor R2, the first circuit protection device 54 and to the output terminal 24 of the lamp circuit 22. Note that the resistance of the second resistor R2 is large enough so that the current that flows through the first switching device 50 does not cause the switch element 70 associated with first switching device 50 to close (and thereby couple the output terminal 24 to the power source 60). Current, as a low current test signal, applied to the output terminal 24 passes through the set of lamps, which could be either incandescent lights or light emitting diodes to create the test voltage. As the low current test signal passes through the short circuit to the electrical ground G, the test voltage is relatively low, the first capacitor C1 is not charged sufficiently to turn the second transistor T2 on. The low current test signal also charges the second capacitor C2 and the third capacitor C3 through the fifth resistor R5 and the seventh resistor R7, respectively. The time constant C2×R5 is smaller than the time constant C3×R7 so that the third transistor T3 turns on before the seventh transistor T7. At time $t_8$, the voltage across the second capacitor C2 reaches a second predetermined threshold $V_{TH2}$, causing the third transistor T3 to turn on, which causes the fourth transistor T4 and the first transistor T1 to turn off. As the fourth transistor T4 no longer holds node m low, a fourth capacitor C4 charges, causing a fifth transistor T5 to turn on, which in turn causes a sixth transistor T6 to turn on and the switch element 72 associated with the second switching device 52 to close. Closing of the second switch element 72 couples the output terminal 24 to the power source 60. The presence of a short circuit between the output terminal 24 and the electrical ground G, however, will not permit the voltage at node e to rise sufficiently and as such, the first capacitor C1 will not charge to the first predetermined threshold $V_{TH1}$. Consequently, the second transistor T2 will be maintained in an off condition.

From time $t_8$ through time $t_9$, the activated input signal at the input terminal 23 continues to charge both the second capacitor C2 and the third capacitor C3. Application of voltage beyond the second predetermined voltage $V_{TH2}$ has no effect and the third transistor T3 remains on. At time $t_9$, the voltage across the third capacitor C3 exceeds a third predetermined voltage $V_{TH3}$, causing the seventh transistor T7 to turn on, which in turn causes the fifth transistor T5 and the sixth transistor T6 to turn off an the second switching device 52 to open. As the third transistor T3 and the seventh transistor T7 remains on, the fourth transistor T4 and the fifth transistor T5 are maintained in an off condition and consequently, the control circuit 20 maintains the switch element 72 associated with the second switching device 52 in the open condition.

At time $t_{10}$, the input signal at the input terminal 23 is deactivated, which turns the third transistor T3 and the seventh transistor T7 off, thereby resetting the control circuit 20.

Figure 5:
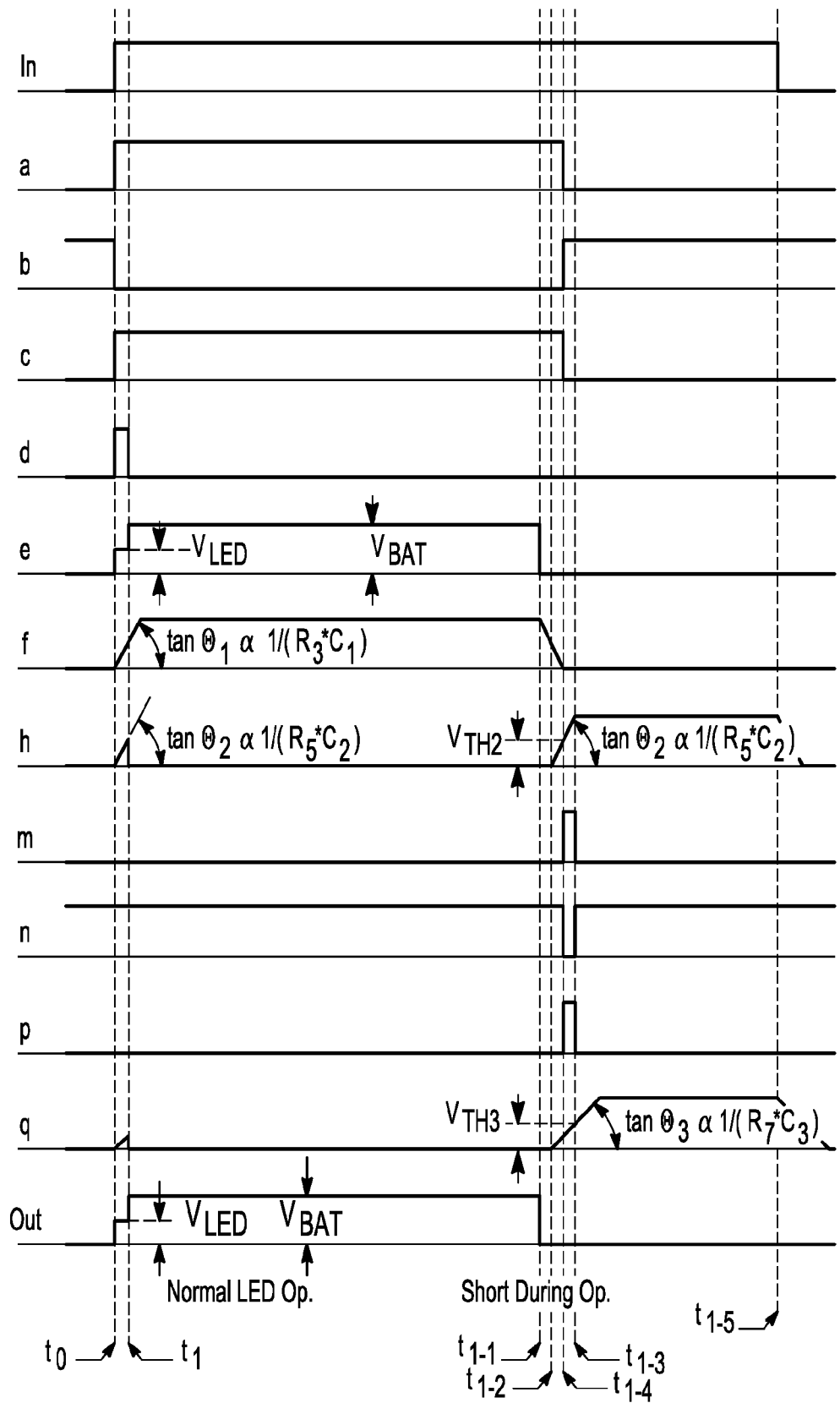
FIG. 5 is a schematic illustration of the voltage at various points of the automotive electric system of FIG. 1 when the output of the automotive electric system is coupled to a set of lamps that is comprised of light emitting diodes as well as a resistive short circuit.

With reference to FIGS. 1 and 5, if a resistive short circuit occurs between the output terminal 24 and the electrical ground G at a time between time $t_1$ and time $t_2$ when the set of lamps is comprised of one or more light emitting diodes 30 (i.e., when the trailer lamp circuit 34 is coupled to the vehicle 8 in the example provided), the control circuit 20 can open the switch element 70 of the first switching device 50 to prevent damage to the lamp circuit 22. In this example, a resistive short circuit can occur between the output terminal 24 and the electrical ground G at time $t_{1-1}$, which can cause the voltage at the output terminal 24 (and node e) to drop below the first predetermined voltage threshold $V_{TH1}$. In this scenario, the resistive short circuit would not conduct sufficient current to cause the first circuit protection device 54 to activate. As the voltage across the first capacitor C1 is higher than the voltage at node e, the voltage at node f drops until it reaches the voltage at node e at time $t_{1-3}$, causing the second transistor T2 to turn off and the switch element 70 associated with the first switching device 50 to open.

From time $t_{1-2}$ through time $t_{1-4}$, the activated input signal at the input terminal 23 continues to charge both the second capacitor C2 and the third capacitor C3. Application of voltage beyond the second predetermined voltage $V_{TH2}$ has no effect and the third transistor T3 remains on. At time $t_{1-4}$, the voltage across the third capacitor C3 exceeds a third predetermined voltage $V_{TH3}$, causing the seventh transistor T7 to turn on, which in turn causes the fifth transistor T5 and the sixth transistor T6 to turn off an the second switching device 52 to open. As the third transistor T3 and the seventh transistor T7 remains on, the fourth transistor T4 and the fifth transistor T5 are maintained in an off condition and consequently, the control circuit 20 maintains the second switching device 52 in the open condition.

At time $t_{1-5}$, the input signal at the input terminal 23 is deactivated, which turns the third transistor T3 and the seventh transistor T7 off, thereby resetting the control circuit 20.

Figure 6:
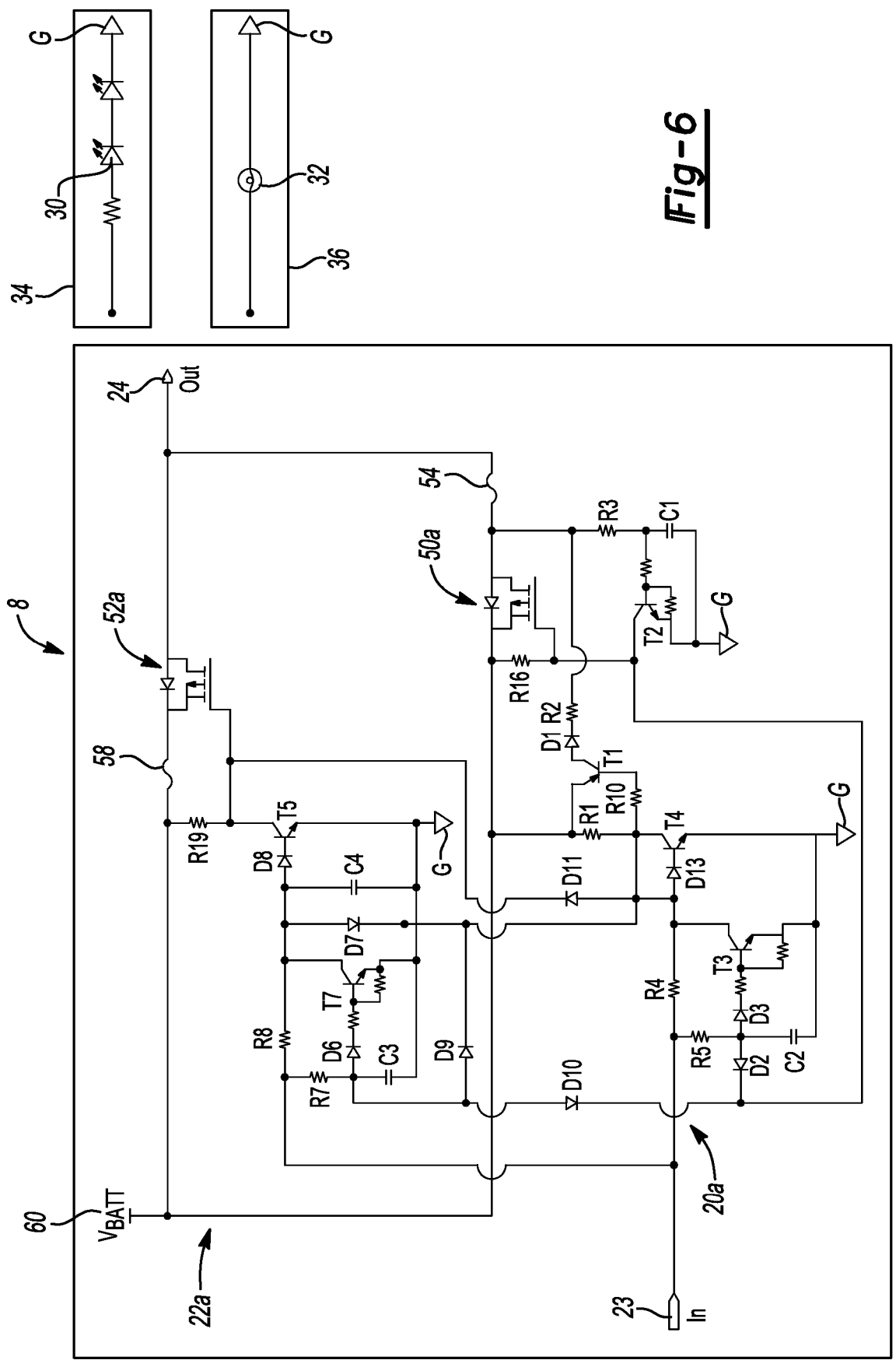
FIG. 6 is a schematic illustration of a vehicle having a second automotive electric system constructed in accordance with the teachings of the present disclosure, the vehicle shown in association with a pair of trailers.

While the automotive electric system 10 has been illustrated and described as including a control circuit 20 and a lamp circuit 22 that employ relays as the first and second switching devices 50 and 52, those of ordinary skill in the art will appreciate from this disclosure that the an automotive electric system constructed in accordance with the present disclosure may be configured somewhat differently. For example, a solid-state devices, such as field effect transistors, can be employed in the control circuit 20a for the first and second switching devices 50a and 52a as illustrated in FIG. 6, rather than the relays that are employed for the first and second switching devices 50 and 52 of FIG. 1. The solid state devices can be of any suitable type, such as MOSFETs, and can be employed in the lamp circuit 22a to selectively couple the power source 60 to the output 24 of the lamp circuit 22a.

Figure 7:
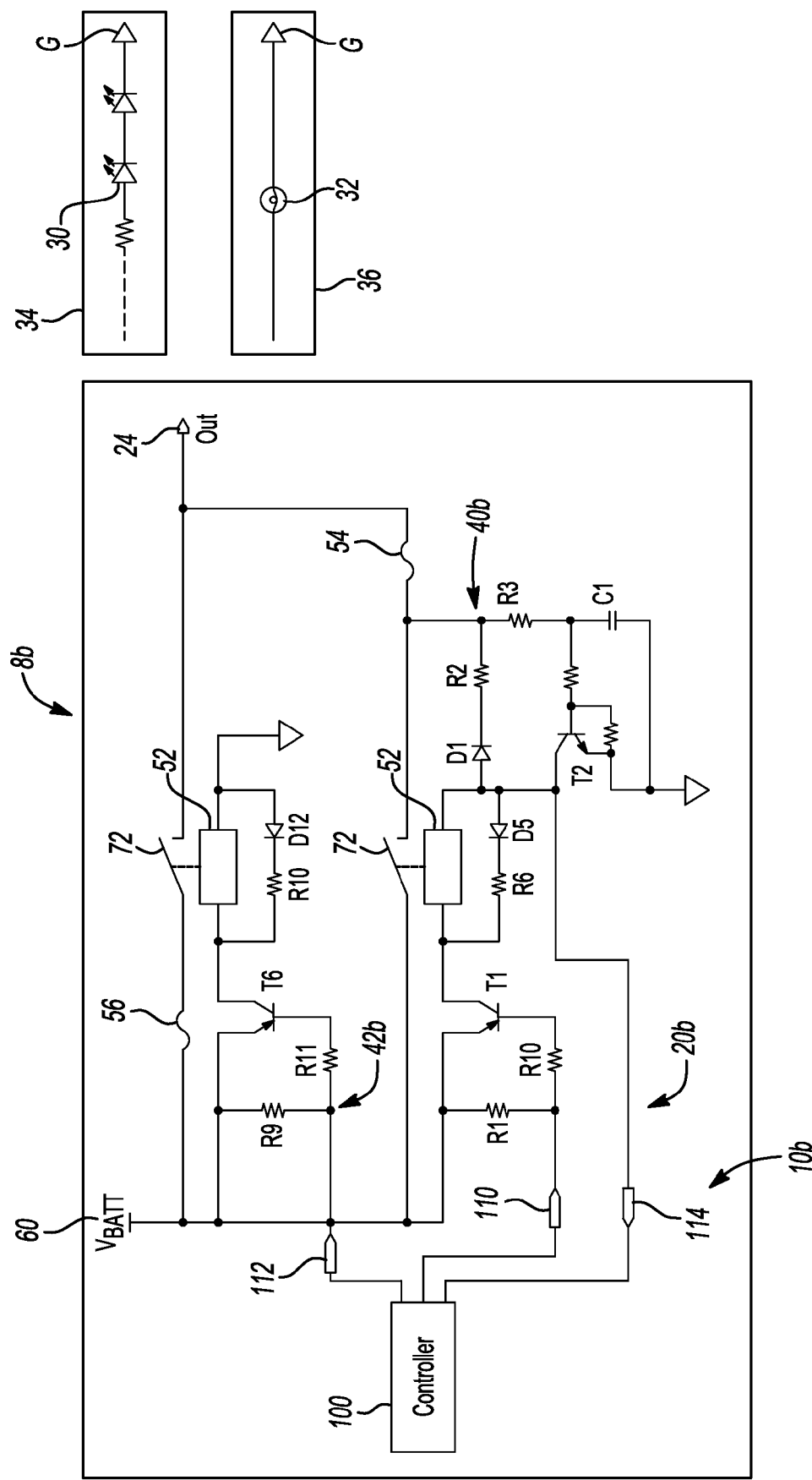
FIG. 7 is a schematic illustration of a vehicle having a third automotive electric system constructed in accordance with the teachings of the present disclosure, the vehicle shown in association with a pair of trailers.

Moreover, it will be appreciated that an automotive electric system constructed in accordance with the teachings of the present disclosure could include a controller that employs feedback from the control circuit to control the lamp circuit. In the example of FIG. 7, the automotive electric system 10b includes a controller 100 is coupled to the control circuit 20b. The controller 100 is configured to output a first signal to a first circuit portion 40b of the control circuit 20b and a second signal to a second circuit portion 42b of the control circuit 20b.

When the set of lamps is comprised of one or more light emitting diodes 30 in the example provided (i.e., when the vehicle 8b is coupled to the trailer lamp circuit 34 in the example provided), the controller 100 can provide the first signal to the first circuit portion 40b of the control circuit 20b and withhold the second signal from the second circuit portion 42b of the control circuit 20b such that a first input terminal 110 that is coupled to the first circuit portion 40b can be maintained in a high voltage state, while a second input terminal 112 that is coupled to the second circuit portion 42b can be maintained in a low voltage state. The first signal can turn the first transistor T1 on so that power is transmitted through the first switching device 50 (which is a relay in the example provided), the first diode D1, the second resistor R2, and the first circuit protection device 54 to the output terminal 24. Current passing through the light emitting diodes 30 can produce a voltage that is applied to the first capacitor C1 and when the first capacitor C1 is sufficiently charged, the second transistor T2 can be turned on such that a feedback terminal 114 that is coupled to the controller 100 is coupled to an electrical ground G (i.e., the voltage on the feedback terminal 114 is low) and the switch element 70 associated with the first switching device 50b is closed to thereby couple the output terminal 24 to the power source 60.

When the set of lamps is comprised of one or more incandescent lights 32 in the example provided (i.e., when the vehicle 8b is coupled to the trailer lamp circuit 36 in the example provided), the controller 100 can provide the first signal to the first circuit portion 40b of the control circuit 20b and withhold the second signal from the second circuit portion 42b of the control circuit 20b to maintain the first input terminal 110 in a high voltage state and the second input terminal 112 in a low voltage state. The first signal can turn the first transistor T1 on so that power is transmitted through the first switching device 50, the first diode D1, the second resistor R2, the first circuit protection device 54 to the output terminal 24. Current passing through the incandescent lights 32 does not produce sufficient voltage to charge the first capacitor C1 to the point where the second transistor T2 can be turned on so that the voltage on the feedback terminal 114 (which is applied through the first switching device 50 by the first signal) remains high. The controller 100 can toggle the second signal on such that the second input terminal 112 is maintained in a high voltage state. The second signal can turn the sixth transistor T6 on to pass current through the second switching device 52 to the electrical ground G. Current passing through the second switching device 52 is sufficiently high so that the switch element 72 associated with the second switching device 52 closes to thereby couple the output terminal 24 to the power source 60, which has the effect of applying the voltage $V_{BATT}$ of the power source 60 to the first capacitor C1. When the first capacitor C1 is sufficiently charged, the second transistor T2 can be turned on such that the feedback terminal 114 that is coupled to the controller 100 is coupled to the electrical ground G (i.e., the voltage on the feedback terminal 114 is low). Additionally, the switch element 70 associated with the first switching device 50 is closed when the second transistor T2 is turned on to thereby couple the output terminal 24 to the power source 60, but this has no effect on the output terminal 24 as the switch element 72 associated with the second switching device 52 is closed and couples the power source 60 to the output terminal 24.

When the output terminal 24 of the lamp circuit 22 is coupled to a short circuit, the controller 100 can provide the first signal to the first circuit portion 40b of the control circuit 20b and withhold the second signal from the second circuit portion 42b of the control circuit 20b to maintain the first input terminal 110 in a high voltage state and the second input terminal 112 in a low voltage state. The first signal can turn the first transistor T1 on so that power is transmitted through the first switching device 50, the first diode D1, the second resistor R2, the first circuit protection device 54 to the output terminal 24. Current passing through the incandescent lights 32 does not produce sufficient voltage to charge the first capacitor C1 to the point where the second transistor T2 can be turned on so that the voltage on the feedback terminal 114 (which is applied through the first switching device 50 by the first signal) remains high. The controller 100 can toggle the second signal on such that the second input terminal 112 is maintained in a high voltage state. The second signal can turn the sixth transistor T6 on to pass current through the second switching device 52 to the electrical ground G. Current passing through the second switching device 52 is sufficiently high so that the switch element 72 associated with the second switching device 52 closes to thereby couple the output terminal 24b to the power source 60. As the current is passed through the short circuit, the first capacitor C1 is not charged sufficiently to turn on the second transistor T2 and consequently, the voltage on the feedback terminal 114 (which is applied through the first switching device 50 by the first signal) remains high indicating the short circuit condition. The controller 100 can toggle the first and second activated input signals off such that the first transistor T and the sixth transistor T6 turn off, which can cause the first and second switching devices 50 and 52 to de-energize to thereby decouple the output terminal 24 from the power source 60.

In summary, the controller 100 can identify the type of light/lights that is/are coupled to the output terminal 24 and can identify situations where the output terminal 24 is coupled to a short circuit through selective application of the first and second low current signals and monitoring a voltage state of the feedback terminal 114 as detailed in the following table.

| State of First Input Terminal (110) | State of Second Input Terminal (112) | State of Feedback Terminal (114) | Inference |
|---|---|---|---|
| High | Low | Low | Output coupled to one or more LEDs |
| High | Low | High | Output coupled to one or more incandescent lights or short circuit |
| High | High | Low | Output coupled to one or more LEDs or incandescent lights |
| High | High | High | Output coupled to short circuit |

Figure 8:
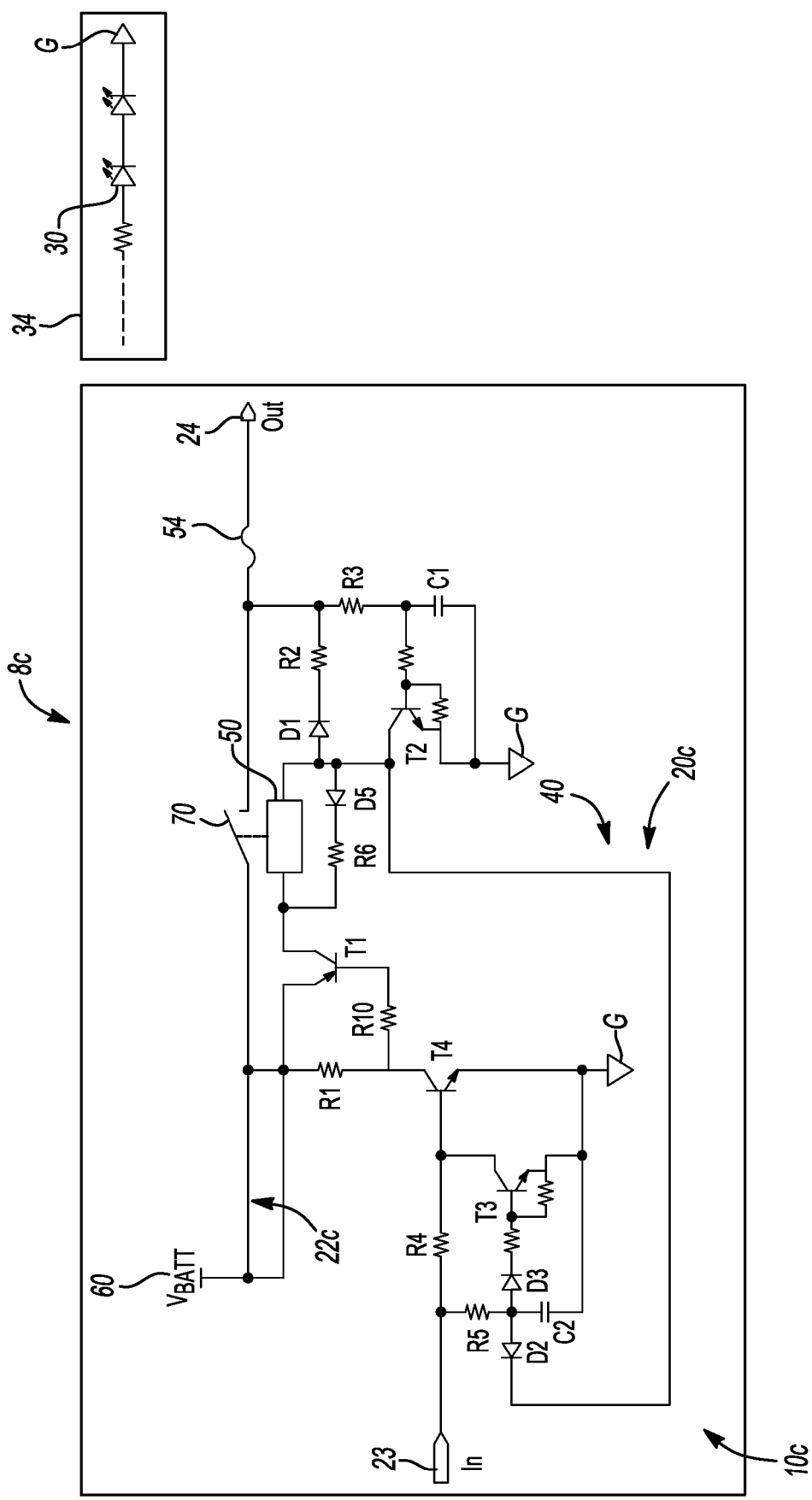
FIG. 8 is a schematic illustration of a vehicle having a fourth automotive electric system constructed in accordance with the teachings of the present disclosure, the vehicle shown in association with a pair of trailers.

In the example of FIG. 8, another automotive electric system 10c constructed in accordance with the teachings of the present disclosure is illustrated. The automotive electric system 10c can be similar to the automotive electric system 10 of FIG. 1, except that it lacks the second circuit portion 42 (FIG. 1) of the control circuit 20 (FIG. 1), as well as the second switching device 52 (FIG. 1) and the second circuit protection device 56 (FIG. 1). Stated another way, the automotive electric system 10c includes a control circuit 20c with only the first circuit portion 40 and a lamp circuit 22c with only the first switching device 50, the first circuit protection device 54 and the output terminal 24 that are described above. In the example provided, the automotive electric system 10c is configured to close switch element 70 that is associated with the first switching device 50 only when the output terminal 24 is coupled to a set of lamps that are comprised of one or more light emitting diodes 30 (i.e., when the vehicle 8c is coupled to the trailer lamp circuit 34 in the example provided), as well as to open the switch element 70 associated with the first switching device 50 to decouple the output terminal 24 from the power source 60 if the output terminal 24 is coupled to a resistive short circuit.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims.

What is claimed is:

1. A method for controlling a lamp circuit, the method comprising:
   setting a first voltage threshold and a first time window within a control circuit corresponding to a characteristic of a first lamp type;
   providing a first signal through the lamp circuit to start a first time interval and create a first test voltage;
   comparing the first test voltage to the first voltage threshold; and
   operating a switch to couple an output of the lamp circuit to a source of electrical power if the first test voltage is greater than or equal to the first voltage threshold before the first time interval exceeds the first time window.

2. The method of claim 1, further comprising:
   providing an indicate signal within a control circuit corresponding to a state in which the lamp circuit is operating; and
   changing a state of the indicate signal if the first test voltage is not greater than or equal to the first voltage threshold before the first time interval exceeds the first time window.

3. The method of claim 1, wherein the first test voltage will not reach the first voltage threshold before the first time interval exceeds the first time window if a lamp that is coupled to the lamp circuit is a second lamp type or a short circuit condition exists between the output of the lamp circuit and an electrical ground.

4. The method of claim 1, further comprising providing a second signal through the lamp circuit to operate a second switch such that the second switch couples the lamp circuit to the source of electrical power.

5. The method of claim 4, further comprising toggling the second signal to identify a short circuit condition between the output of the lamp circuit and an electrical ground.

6. The method of claim 1, wherein a first circuit protection device is disposed in a first path that couples the source of electrical power, the first switch and the output of the lamp circuit, and a second circuit protection device is disposed in a second path that couples the source of electrical power, the second switch and the output of the lamp circuit.

7. The method of claim 6, wherein the second circuit protection device is configured to conduct more current than the first circuit protection device.

8. The method of claim 6, wherein the first circuit protection device is disposed between a device that senses the first test voltage and the output of the lamp circuit and wherein the second circuit protection is disposed between the source of electrical power and the second switch.

9. The method of claim 6, wherein the first and second circuit protection devices are fuses.

10. The method of claim 1, wherein providing the first signal through the lamp circuit starts a second time interval and wherein the method further comprises:
    generating a second test voltage; and
    operating a second switch to couple the output of the lamp circuit to the source of electrical power if the second test voltage is greater than or equal to a second voltage threshold before the second time interval exceeds a second time window.

11. The method of claim 10, wherein a first circuit protection device is disposed between the first capacitor and the output of the lamp circuit and a second circuit protection device is disposed between the source of electrical power and the second switch and wherein the second circuit protection device is configured to conduct more current than the first circuit protection device, wherein a first circuit protection device is disposed in a first path that couples the source of electrical power, the first switch and the output of the lamp circuit, and a second circuit protection device is disposed in a second path that couples the source of electrical power, the second switch and the output of the lamp circuit.

12. The method of claim 11, wherein the first and second current protection devices are fuses.

13. The method of claim 10, wherein the first and second switches are selected from a group consisting of relays and solid state switches.

14. The method of claim 10, wherein the method further comprises:
    creating a third test voltage;
    coupling a resistive short circuit to the output of the lamp circuit; and
    de-energizing the second switch after the third test voltage exceeds a predetermined third voltage threshold.

15. A method for controlling a lamp circuit, the method comprising:
    setting a first voltage threshold within a control circuit corresponding to a characteristic of a first lamp type;
    providing a first signal to a lamp;
    comparing a measured voltage drop across the lamp to the first voltage threshold to determine whether the lamp is the first lamp type; and
    activating a first circuit portion of the control circuit to couple a power source to the output of the lamp circuit if the lamp is the first type of lamp.

16. The method of claim 15, wherein if the lamp is not the first type of lamp, the first circuit portion of the control circuit activates a second circuit portion of the control circuit to couple the power source to the output of the lamp circuit.

17. The method of claim 16, further comprising:
    determining whether the output of the lamp circuit is coupled to a resistive short circuit; and
    opening the first and second switching elements to decouple the power source from the output of the lamp circuit.

18. The method of claim 15, wherein the lamp circuit includes a first switching element, which is controlled by the first circuit portion, and a second switching element, which is controlled by the second circuit portion, each of the first and second switching elements having a first terminal, which is coupled to the source of electrical power, and a second terminal, wherein a first circuit protection device is electrically coupled to the first switching element and wherein a second circuit protection device is electrically coupled to the second switching element.

19. The method of claim 18, wherein the second circuit protection device is configured to conduct more current than the first circuit protection device.

20. The method of claim 18, wherein the first and second circuit protection devices are fuses.

21. The method of claim 15, further comprising:
toggling a second signal to a second circuit portion of the control circuit to determine whether the lamp is a second lamp type; and
activating the second circuit portion to provide power from the power source to the output of the lamp circuit if the lamp is the second type of lamp.

22. The method of claim 21, further comprising determining whether the output of the lamp circuit is coupled to a resistive short circuit.

* * * * *